United States Patent
Tanaka et al.

(10) Patent No.: US 10,856,219 B2
(45) Date of Patent: Dec. 1, 2020

(54) COMMUNICATION DEVICE, COMMUNICATION METHOD, AND COMPUTER PROGRAM PRODUCT

(71) Applicant: Kabushiki Kaisha Toshiba, Minato-ku (JP)

(72) Inventors: Yasuyuki Tanaka, Chigasaki (JP); Mitsuru Kanda, Kita (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 99 days.

(21) Appl. No.: 16/114,336

(22) Filed: Aug. 28, 2018

(65) Prior Publication Data

US 2019/0268839 A1   Aug. 29, 2019

(30) Foreign Application Priority Data

Feb. 28, 2018   (JP) .................. 2018-035702

(51) Int. Cl.
*H04W 48/20* (2009.01)
*H04W 48/18* (2009.01)
*H04W 72/04* (2009.01)
*H04W 74/08* (2009.01)

(52) U.S. Cl.
CPC .......... *H04W 48/20* (2013.01); *H04W 48/18* (2013.01); *H04W 72/0446* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2011/0096679 | A1* | 4/2011 | Hayashino | H04W 72/082 370/252 |
| 2015/0131637 | A1* | 5/2015 | Rubin | G08G 1/166 370/337 |
| 2016/0262098 | A1* | 9/2016 | Vijayasankar | H04W 52/0209 |
| 2018/0359789 | A1* | 12/2018 | Yang | H04W 76/28 |
| 2019/0082028 | A1 | 3/2019 | Tanaka | |

FOREIGN PATENT DOCUMENTS

| | | |
|---|---|---|
| JP | 2000-152319 | 5/2000 |
| JP | 2013-110677 | 6/2013 |
| JP | 2015-12447 | 1/2015 |
| JP | 2015-162734 | 9/2015 |
| JP | 2019-50524 A | 3/2019 |

OTHER PUBLICATIONS

IEEE Computer Society, "IEEE Standard for Low-Rate Wireless Networks," IEEE Std 802.15.4-2015, 2016, 95 Pages.
Q. Wang, et al., "6top Protocol (6P) draft-ietf-6tisch-6top-protocol-09," 6TiSCH Internet-Draft, Oct. 2017, 46 Pages.

* cited by examiner

*Primary Examiner* — Saba Tsegaye
(74) *Attorney, Agent, or Firm* — Oblon, McClelland, Maier & Neustadt, L.L.P.

(57) ABSTRACT

According to one embodiment, a communication device includes one or more processors. The one or more processors configured to function as a plurality of communication control units and a selection unit. The plurality of communication control units control communication in accordance with a plurality of control schemes that differ from each other. The selection unit selects a communication control unit for use in communication from the communication control units based on selection criteria.

6 Claims, 10 Drawing Sheets

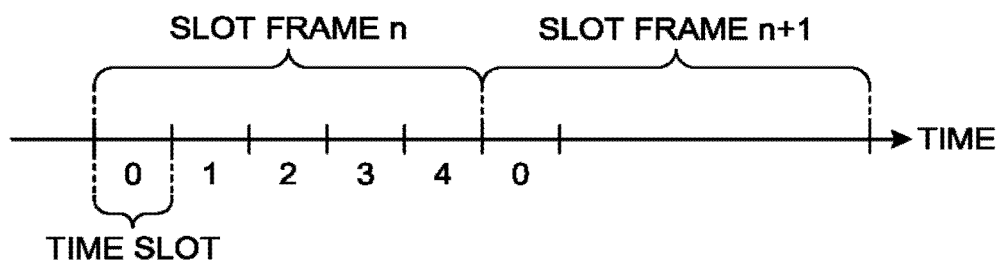

FIG.6

| CHANNEL OFFSETS | | | | | |
|---|---|---|---|---|---|
| 3 | | | | | |
| 2 | | 100a→100b | | | |
| 1 | | | | | |
| 0 | SHARED | | | | |
| | 0 | 1 | 2 | 3 | 4 |

TIME SLOTS

FIG.7

| CHANNEL OFFSETS | | | | | | | CHANNEL |
|---|---|---|---|---|---|---|---|
| 3 | | | | | | 13 | |
| 2 | | TSCH 100a→100b | | | | 12 | |
| 1 | | | CSMA | CSMA | CSMA | 11 | |
| 0 | TSCH SHARED | | | | | 10 | |
| | 0 | 1 | 2 | 3 | 4 | | |

TIME SLOTS

FIG.11

| CHANNEL OFFSETS | | | | | | | CHANNEL |
|---|---|---|---|---|---|---|---|
| 3 | | | | | | | 13 |
| 2 | | TSCH 100-2a→100-2b | | | | | 12 |
| 1 | | | CSMA | CSMA | CSMA | | 11 |
| 0 | TSCH SHARED | | | | | | 10 |
| | 0 | 1 | 2 | 3 | 4 | | |

TIME SLOTS

FIG.12

| CHANNEL OFFSETS | | | | | | | CHANNEL |
|---|---|---|---|---|---|---|---|
| 3 | | | TSCH 100-2a→100-2c | | | | 13 |
| 2 | | TSCH 100-2a→100-2b | | | | | 12 |
| 1 | | | | CSMA | CSMA | | 11 |
| 0 | TSCH SHARED | | | | | | 10 |
| | 0 | 1 | 2 | 3 | 4 | | |

TIME SLOTS

FIG.13

| Channel Offsets \ Time Slots | 0 | 1 | 2 | 3 | 4 |
|---|---|---|---|---|---|
| 3 | | | TSCH 100-2a→100-2c | | |
| 2 | | TSCH 100-2a→100-2b | | | |
| 1 | | | | TSCH 100-2a→100-2d | |
| 0 | TSCH SHARED | | | | |
| Channel | | | | | |
| | | | | | |
| | 10 | 11 | 12 | 13 | |

| CHANNEL OFFSETS | | | | | | | CHANNEL |
|---|---|---|---|---|---|---|---|
| 3 | | | Wi-SUN FAN | | | 13 | |
| 2 | | TSCH 100a→100b | | | | 12 | |
| 1 | | | | SPECIFIC TO RESOURCE PROVIDER | | 11 | |
| 0 | TSCH SHARED | | | | | 10 | |
| | 0 | 1 | 2 | 3 | 4 | | |

TIME SLOTS

COMMUNICATION DEVICE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-035702, filed on Feb. 28, 2018; the entire contents of which are incorporated herein by reference.

FIELD

Embodiments disclosed herein relate generally to a communication device, a communication method, and a computer program product.

BACKGROUND

The IEEE 802.15.4-2015 standard defines the transmission/reception method of time slotted channel hopping (TSCH). In the TSCH scheme, each communication node shares communication timing allowing it to communicate with high reliability. Using the 6top protocol that has been proposed by the Internet Engineering Task Force (IETF) 6TiSCH working group enables neighbor nodes to dynamically agree on the communication timing of TSCH. Conventional techniques are described in, for example, IEEE 802.15.4-2015 IEEE Standard for Low-Rate Wireless Networks and "6top Protocol (6P) draft-ietf-6tisch-6top-protocol-09", Oct. 25, 2017.

Unfortunately, the conventional techniques may fail to effectively build a communication system that enables communication using a plurality of control schemes (communication schemes). TSCH, for example, is not compatible with other communication schemes and thus TSCH nodes cannot be included in an existing communication system without stopping the system. Suppose that the existing communication system uses carrier sense multiple access/collision avoidance (CSMA/CA) and some of the terminals included in the communication system are replaced with TSCH terminals. In this case, the CSMA/CA terminals cannot communicate with the TSCH terminals and the communication system and its network are divided, resulting in an unsatisfactory system operation.

BRIEF DESCRIPTION OF THE DRAWINGS

FIG. 3 is a diagram illustrating example units of time division for time-division multiplexing;

FIG. 4 is a diagram illustrating an example schedule in an initial state;

FIG. 5 is a diagram illustrating an example schedule;

FIG. 6 is a diagram illustrating an example schedule including channel offsets;

FIG. 7 is a diagram illustrating an example schedule used by a node according to the first embodiment;

FIG. 11 is a diagram illustrating an example internal schedule in an initial state according to the second embodiment;

FIG. 12 is a diagram illustrating an example internal schedule of a node altered in consideration of the TSCH communication;

FIG. 13 is a diagram illustrating an example internal schedule of a node after switching of communication schemes;

DETAILED DESCRIPTION

Figure 1:
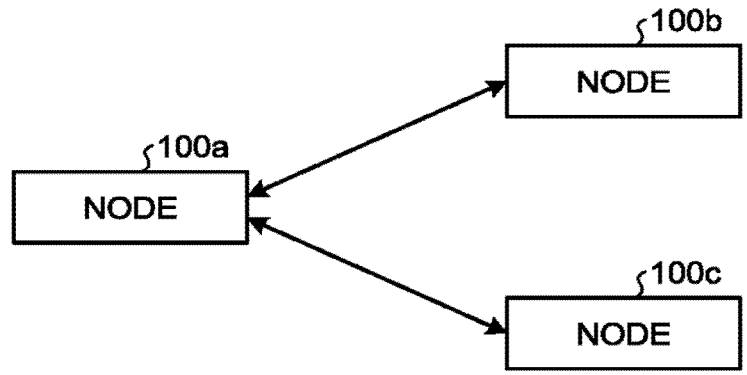
FIG. 1 is a block diagram illustrating a communication system according to a first embodiment.

According to one embodiment, a communication device includes one or more processors. The one or more processors configured to function as a plurality of communication control units and a selection unit. The plurality of communication control units control communication in accordance with a plurality of control schemes that differ from each other. The selection unit selects a communication control unit for use in communication from the communication control units based on selection criteria.

The following fully describes preferred embodiments of a communication device according to the present disclosure with reference to the accompanying drawings.

The TSCH scheme allows a transmitter node and a receiver node to transmit and receive data at certain time and frequency determined in advance. In order for the nodes to remain clock synchronized, the TSCH scheme causes the nodes to transmit and receive control data at certain intervals if the transmitter node has no data to transmit. The TSCH scheme changes channels (frequencies) for use in communication in every data transmission/reception. The TSCH scheme that controls communication in this manner can achieve highly reliable data communication. However, as discussed above, the TSCH scheme cannot be applied to an existing communication system using a communication scheme that is not compatible with TSCH without stopping the existing communication system. The communication device to be described in the following embodiments can effectively build a communication system that enables communication using a plurality of control schemes (communication schemes).

First Embodiment

A communication device according to a first embodiment uses TSCH as an example of a plurality of communication schemes. The communication device according to the first embodiment adds cells (slots) for executing an operation of a communication scheme other than the TSCH scheme (non-TSCH operation) to the TSCH cells (slots). For example, the communication device is configured to define cells that operate in accordance with CSMA/CA and combine them with the existing TSCH cells for TSCH scheduling. Cells for the non-TSCH operation and TSCH cells may be managed in different slot frames or in the same slot frame.

If transmission processing or reception processing is being performed at the end of time of a cell for the non-TSCH operation, the ongoing processing may be continued beyond the end of time of the cell until the processing is completed.

Cells for the non-TSCH operation, as well as the TSCH cells, can include attributes relating to channels for use in communication to specify which channel to use in transmitting or receiving data. Timing and channel may be manually set or dynamically (automatically) set to determine at which time and on which channel the non-TSCH operation is performed. To automatically set the timing and channel, a protocol such as the 6top Protocol, which is used by TSCH, and other protocols corresponding to the 6top Protocol can be used.

As the number of TSCH terminals increase in the existing communication system, the communication device may automatically allocate more cells to the TSCH operation and less cells to the non-TSCH operation until all the cells become the TSCH cells.

FIG. 1 as a block diagram illustrating an example configuration of a communication system according to the first embodiment. As illustrated in FIG. 1, the communication system includes nodes 100a, 100b, and 100c as communication devices. The number of each node 100a, 100b, and 100c may be two or more.

Data is transmitted and received between the node 100a and the node 100b and between the node 100a and the node 100c. For ease of discussion, the node 100a represents a transmitter node that transmits data and the nodes 100b and 100c represent receiver nodes that receive data.

The node 100a and the node 100b are time-synchronized and transmit and receive data at certain timing determined in advance. Typically, communication between the node 100a and the node 100b is controlled by TSCH, but other time-division multiplexing schemes other than TSCH may be used. The node 100a and the node 100c communicate using, for example, CSMA/CA. CSMA/CA is described for illustrative purposes only, and the node 100a and node 100c may communicate using any communication scheme other than the scheme used between the node 100a and the node 100b, such as the Wi-SUN FAN protocol or a communication scheme specific to a resource provider.

Figure 2:
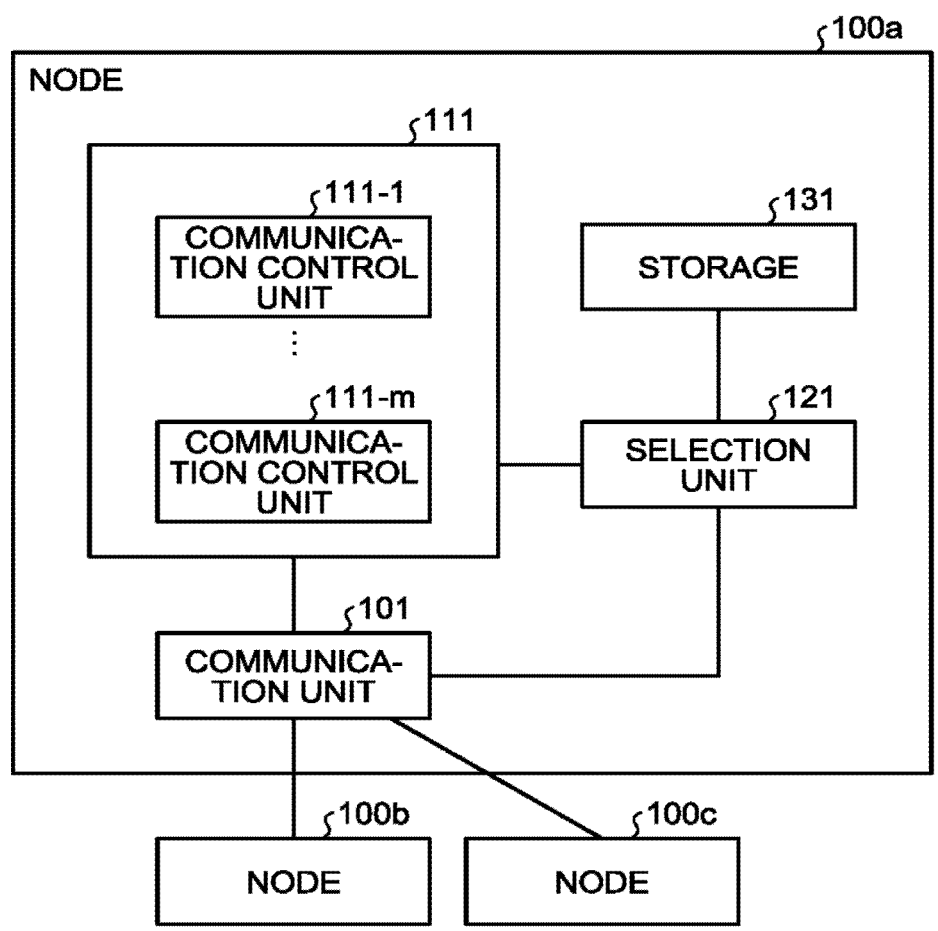
FIG. 2 is a block diagram of a node according to the first embodiment.

FIG. 2 is a block diagram illustrating an example configuration of the node 100a according to the first embodiment. As illustrated in FIG. 2, the node 100a includes a communication unit 101, a communication control unit group 111, a selection unit 121, and storage 131.

The communication unit 101 serves as an interface for communicating with external devices such as other nodes (nodes 100b, 100c). The communication unit 101 communicates with an external device under the control of a communication control unit selected from a plurality of communication control units 111-1 to 111-m included in the communication control unit group 111. The communication unit 101 transmits and receives radio waves, and conforms to technical specifications that should be satisfied as a wireless communication station, such as data encoding and limiting of transmission time.

The communication control unit group 111 includes a plurality of communication control units 111-1 to 111-m (m is a natural number). The communication control units 111-1 to 111-m control communication in accordance with a plurality of control schemes that differ from each other. The following mainly describes a communication device having two communication control units (m=2), a communication control unit that uses TSCH and a communication control unit that uses CSMA/CA for controlling communication. This is, however, illustrative purposes only and the communication device may have three or more communication control units.

The communication control unit 111-1 (first communication control unit) controls, for example, a time-division multiplexed communication such as TSCH communication. The communication control unit 111-1 controls, for example, the communication unit 101 to transmit and receive messages in accordance with a schedule set in advance. If the communication control unit 111-1 uses a communication scheme including frequency hopping such as TSCH, the communication control unit 111-1 controls wireless channels for use in communication in addition to communication timing, and communicates via, for example, the communication unit 101.

The communication control unit 111-2 (second communication control unit) controls communication processing of a communication scheme different from TSCH, such as CSMA/CA.

The communication control unit 111-1 is used for controlling communication with the node 100b that communicates using, for example, TSCH. The communication control unit 111-2 is used for controlling communication with the node 100c that communicates using, for example, CSMA/CA.

The storage 131 stores therein various types of data for use in various types of processing performed by the node 100a. The storage 131 stores therein, for example, information on selection criteria (details will be described later) to be used by the selection unit 121. The storage 131 can be implemented by any widely used storage medium such as a hard disk drive (HDD), an optical disc, a memory card, and a random access memory (RAM).

The selection unit 121 selects a communication control unit for use in communication from the communication control units 111-1 to 111-m based on the selection criteria that have been set. The selection unit 121 selects a communication control unit with reference to the selection criteria stored in, for example, the storage 131. The selection unit 121 may add, alter, or delete selection criteria in accordance with an external instruction.

The selection criteria include, for example, at least one of time, a network connection status, and an operating status of the node 100a. The selection criteria may represent a communication schedule for a time-division multiplexing scheme such as TSCH. The selection criteria may be, for example, a communication schedule for TSCH that specifies a cell for TSCH communication starting at a first time and specifies a cell for CSMA/CA communication starting at a second time. In this case, the selection unit 121 selects the communication control unit 111-1 that controls TSCH communication at the first time and selects the communication control unit 111-2 that controls CSMA/CA communication at the second time.

The units above (communication control units 111-1 to 111-m and selection unit 121) are implemented by, for example, one or more processors. The units above may be implemented by, for example, causing a processor such as a central processing unit (CFU) to execute a computer program, in other words, implemented by software. The units above may be implemented by a processor such as a dedicated integrated circuit (IC), in other words, implemented by hardware. The units above may be implemented by both software and hardware. If the communication device includes a plurality of processors, each processor may implement one of the units or may implement two or more of the units.

Described next is communication using a time-division multiplexing scheme. FIG. 3 is a diagram illustrating example units of time division for time-division multiplexing. As illustrated in FIG. 3, the time-division multiplexing scheme divides time into certain periods of fixed length. The smallest unit of time divided into periods is referred to as a time slot, and one or more time slots are collectively referred to as a slot frame. In FIG. 3, for example, one slot frame includes five time slots.

Each time slot can be uniquely identified in a slot frame for management. Each time slot periodically appears over time. In FIG. 3, time slots are identified by using indices 0 to 4. Time slots having the same index appear in each slot frame. Each slot frame can be uniquely identified in a sufficiently long period of time for management. In FIG. 3, for example, the slot frames are labeled using indices such as "n" and "n+1". The time slots may have absolute identifiers for management. This configuration is identical to an infinitely long slot frame including an infinite number of time slots.

In order for the node 100a and the node 100b to communicate, the nodes need a definition as to which node 100 transmits data and which node 100 receives the data in which time slot, or that any of the nodes 100 can transmit and receive data ("shared" in the following description). Determining which processing is performed in which time slot is called scheduling, and the result of the scheduling is called a schedule. FIG. 4 is a diagram illustrating an example schedule in an initial state.

In the schedule illustrated in FIG. 4, the first time slot (time slot 0) of each slot frame is defined as "shared". In the "shared" time slot, the node 100a or the node 100b may transmit data. In other words, the node 100a and the node 100b can transmit data in the first time slot of each slot frame if the node 100a or 100b has data to transmit. If the nodes 100 have no data to transmit, each node waits for data in the first time slot of each slot frame so that the node can receive data if transmitted.

Suppose that the nodes perform a scheduling operation to provide the node 100a with an opportunity to transmit data. FIG. 5 is a diagram illustrating an example schedule set in this case.

If a user does not manually perform scheduling on the node 100a and the node 100b, a control protocol such as the 6top Protocol (6P) is used to adjust the schedule between the node 100a and the node 100b. In addition, for example, the node 100a and the node 100b can share the schedule illustrated in FIG. 5 when the node 100b requests, from the node 100a, a time slot dedicated to the node 100b for receiving data.

If the frequency hopping mechanism (frequency switching mechanism) is used between the node 100a and the node 100b, the schedule includes channels or channel offsets for use in communication in addition to transmission/reception timing between the nodes.

FIG. 6 is a diagram illustrating an example schedule for setting channel offsets. FIG. 6 illustrates an example schedule including four available channels and specifying that the node 100a and the node 100b communicate in time slot 1 in channel offset 2. If a channel offset is specified, the channel for use in communication is determined based on a combination of the channel offset and time information.

In the first embodiment, the node 100a needs a schedule for communicating with the node 100c in addition to the schedule for communicating with the node 100b illustrated in FIG. 6. FIG. 7 is a diagram illustrating an example schedule (internal schedule) used by the node 100a according to the first embodiment. The internal schedule illustrated in FIG. 7 differs from the schedule in FIG. 6 in that a label indicating a communication scheme (TSCH or CSMA) is allocated to each time slot as a communication setting, and actual channels (10 to 13) are set for the communication using CSMA. The internal schedule is stored in, for example, the storage 131.

The node 100a communicates with the node 100b using TSCH in time offsets 0 and 1 and communicates with the node 100c using CSMA in time offsets 2 to 4 in accordance with the internal schedule illustrated in FIG. 7.

Figure 8:
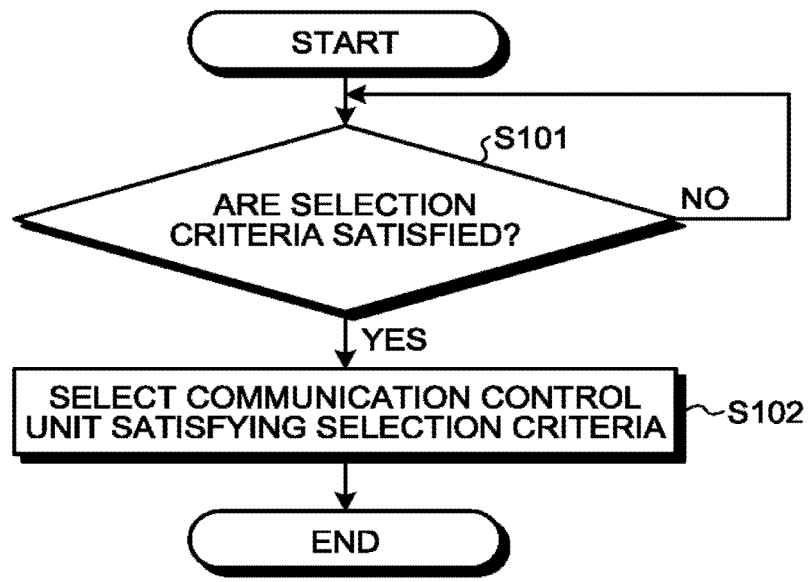
FIG. 8 is a flowchart illustrating a selection process according to the first embodiment.

Described next is a selection process performed by the node 100a above according to the first embodiment. FIG. 8 is a flowchart illustrating an example selection process according to the first embodiment. The selection process is a process performed by the selection unit 121 to select a communication control unit for use in communication.

The selection unit 121 repeatedly refers to selection criteria and determines whether the selection criteria are satisfied (Step S101). Under the selection criteria illustrated in FIG. 7, for example, when time slot 1 comes, the selection unit 121 determines that the node 100a can transmit data to the node 100b using TSCH.

If the selection criteria are not satisfied (No at Step S101), the selection unit 121 repeats the determination processing until the selection criteria are satisfied. If satisfied (Yes at S101), the selection unit 121 selects a communication control unit that satisfies the selection criteria (Step S102). Subsequently, the selected communication control unit controls communication between the node 100a and the other device.

In FIG. 7, for example, the selection unit 121 selects the communication control unit 111-1 that controls TSCH communication when time slot 1 comes. If needed, the election unit 121 switches communication control units for use in communication and performs necessary setting operations so that the newly set communication control unit can control communication. Examples of the necessary setting operations include setting a channel offset, determining whether the communication counterpart is limited, determining information for identifying the communication counterpart if limited, and setting a channel.

If the same communication control unit is continuously selected, for example, from time slot 2 to time slot 4 in channel offset 1, the selection unit 121 need not switch communication control units for use in communication or switch the accompanying settings.

The communication device according to the first embodiment selects a suitable communication control unit based on selection criteria from the communication control units that use a plurality of communication schemes that differ from each other, and the communication device cars maintain communication. This configuration can effectively build a communication system that allows nodes to communicate using a plurality of communication schemes.

Second Embodiment

Described next is a second embodiment in which the selection criteria can be altered. The selection criteria may be altered manually or using an automatic setting protocol such as the 6top Protocol.

Figure 9:
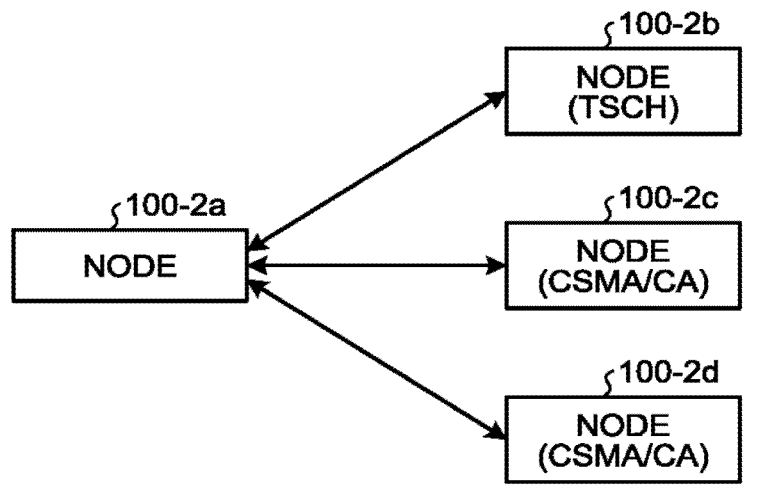
FIG. 9 is a block diagram of a communication system according to a second embodiment.

FIG. 9 is a block diagram illustrating an example configuration of a communication system according to the second embodiment. As illustrated in FIG. 9, the communication system according to the second embodiment includes nodes 100-2a, 100-2b, and 100-2c as communication devices.

Data is transmitted and received between the node 100-2a and the node 100-2b, the node 100-2a and the node 100-2c, and the node 100-2a and the node 100-2d. For ease of discussion, the node 100-2a represents a transmitter node that transmits data, and the nodes 100-2b to 100-2d represent receiver nodes that receive data.

Figure 10:
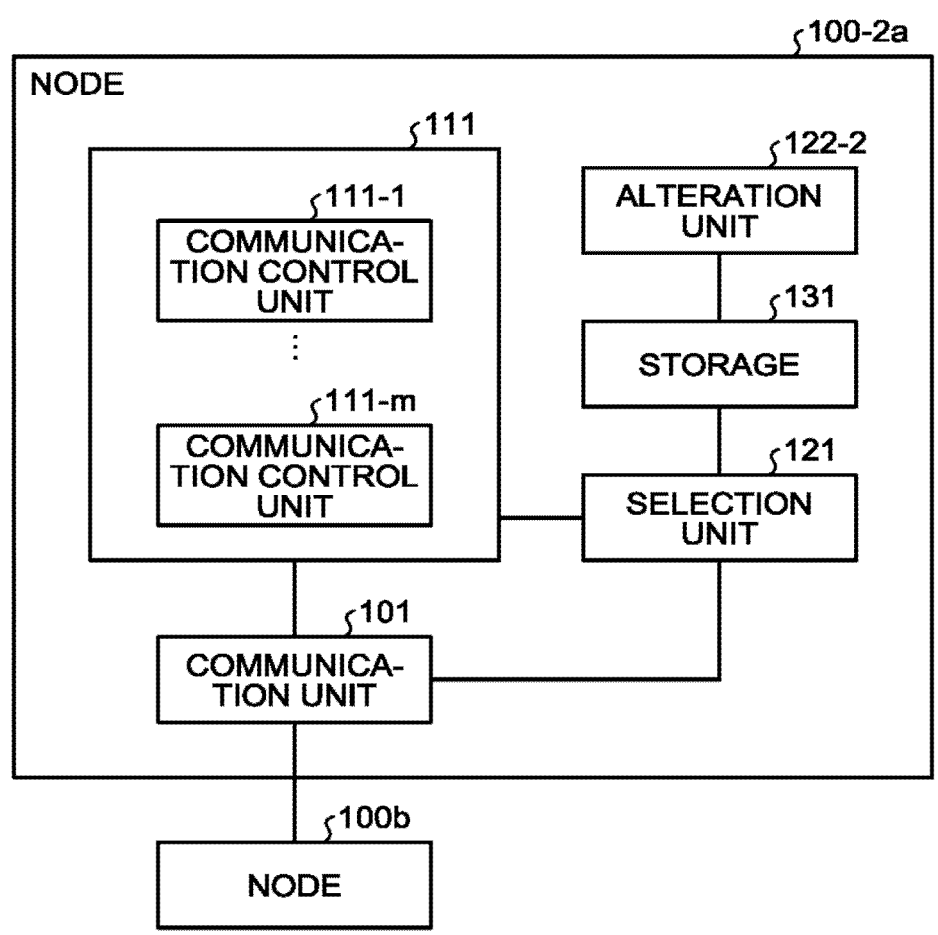
FIG. 10 is a block diagram of a node according to the second embodiment.

FIG. 10 is a block diagram illustrating an example configuration of the node 100-2a according to the second embodiment. As illustrated in FIG. 10, the node 100-2a includes the communication unit 101, the communication control units group 111, the selection unit 121, the storage 131, and an alteration unit 122-2.

The second embodiment differs from the first embodiment in that the node 100-2a further includes the alteration unit 122-2. Other configurations and functions of the node 100-2a are the same as those of the node 100a according to the first embodiment illustrated in the block diagram in FIG. 2. Thus, like reference numerals refer to like units and the explanation thereof is omitted.

The alteration unit 122-2 alters the selection criteria to which the selection unit 121 refers. The alteration unit 122-2 alters the selection criteria in accordance with, for example, the control schemes used by the counterpart nodes 100-2b to 100-2d. The alteration unit 122-2 may alter the selection criteria in accordance with the instruction from a user (e.g., administrator).

FIG. 11 is a diagram illustrating an example internal schedule in an initial state according to the second embodiment. According to the example schedule illustrated in FIG. 11, the node 100-2a communicates with the node 100-2b using TSCH in time slots 0 and 1 and communicates with the nodes 100-2c and 100-2d using CSMA/CA in time slots 2 to 4.

Suppose that the communication scheme of the node 100-2c is changed from CSMA/CA to TSCH in accordance with, for example, replacement of hardware of the node 100-2c. In this case, the node 100-2a needs a new TSCH schedule for the node 100-2c to communicate with the node 100-2c. FIG. 12 is a diagram illustrating an example internal schedule of the node 100-2a altered in consideration of TSCH communication with the node 100-2c.

As can be seen from the comparison between FIG. 11 and FIG. 12, a time slot that has been allocated to CSMA is altered and is allocated to the TSCH communication with 100-2c in accordance with the change in the communication scheme of the node 100-2c from CSMA/CA to TSCH. This alteration allows the node 100-2a to maintain communication with the nodes 100-2b, 100-2c, and 100-2d.

FIG. 13 is a diagram illustrating an example internal schedule of the node 100-2a after switching of communication schemes of the node 100-2d from CSMA/CA to TSCH.

In FIG. 13, one of the time slots that has been allocated to CSMA/CA is allocated to the TSCH communication with the node 100-2d in the same manner as described with reference to FIG. 12. After switching of the communication schemes of the node 100-2d to TSCH, there are no CSMA/CA nodes around the node 100-2a and thus time slots allocated to CSMA/CA are deleted from the inner schedule of the node 100-2a.

In the second embodiment, the node 100-2a alters the inner schedule in accordance with the situation of communication schemes used by neighbor nodes. This configuration allows the node 100-2a to communicate with a node that has changed its communication scheme without stopping the ongoing communication.

Described next are modifications applicable to the first and the second embodiments.

First Modification

Figures 14, 15:
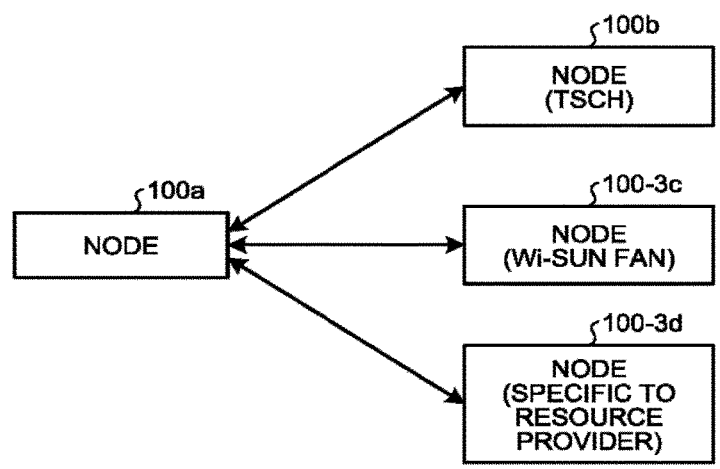
FIG. 14 is a block diagram of a communication system according to a first modification.
FIG. 15 is a diagram illustrating an example internal schedule according to the first modification.

FIG. 14 is a block diagram illustrating an example configuration of a communication system according to a first modification. As illustrated in FIG. 14, the communication system according to the first modification includes nodes 100a, 100b, 100-3c, and 100-3d as communication devices.

The node 100a and the node 100b have the same configurations as those in the first embodiment and thus like reference numerals refer to like units. The node 100-3c uses the Wi-SUN FAN communication scheme. The node 100-3d uses a communication scheme specific to the resource provider.

FIG. 15 is a diagram illustrating an example internal schedule according to the first modification. The inner schedule set in the node 100a provides communication opportunities for the nodes using the communication schemes of TSCH, the Wi-SUN FAN protocol, and a protocol specific to a resource provider so that the node 100a can communicate with the nodes. In this regard, the communication control units may use any desired communication scheme.

Second Modification

The selection criteria may include a criterion having priority information. For example, the selection criteria described above may further include a criterion of "no switching of communications during CSMA/CA communication" as a criterion prior to the internal schedule of the node 100a. For example, the selection unit 121 prefers the criterion of "no switching of communications during CSMA/CA communication" to a criterion, if included in the selection criteria, specifying that a time slot allocated to TSCH communication comes after a time slot allocated to CSMA/CA communication. In other words, the selection unit 121 selects a communication control unit that uses the CSMA/CA communication scheme at the beginning of a time slot for TSCH communication.

If, for example, the node 100a starts communicating with the node 100c using the CSMA/CA scheme immediately before the end of time slot 4 illustrated in FIG. 7, the node 100a does not switch the communication schemes to TSCH when time slot 0 comes, and completes CSMA/CA communication with the node 100c.

If there are a plurality of criteria contradicting with each other, or there are a plurality of suitable criteria, the selection unit 121 may randomly select a criterion from the criteria for the selection process.

Third Modification

Figure 16:
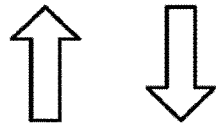
FIG. 16 is a diagram illustrating example internal schedules according to a third modification.

The selection criteria may include a plurality of criteria that are switched in accordance with time. FIG. 16 is a diagram illustrating example internal schedules according to the third modification. In the third modification, the node 100a refers to different schedules in accordance with time. As illustrated in FIG. 16, the node 100a has two schedules, one is used from 0:00 to 22:00 and the other one is used from 22:00 to 0:00 in the next day. The node 100a may switch schedules among three or more schedules.

In this example, the node 100a provides more communication opportunities for the nodes using CSMA/CA than the nodes using TSCH from 0:00 to 22:00, and provides more communication opportunities for the nodes using TSCH than the nodes using CSMA/CA from 22:00 to 0:00 in the next day.

Such switching of schedules in accordance with time may be combined with control methods according to the first and second embodiments and the modifications thereof.

Fourth Modification

The third modification describes an example of switching schedules in accordance with time. The node 100*a* may switch the schedules in accordance with the remaining battery life of the node 100*a*. If, for example, the remaining battery life exceeds a threshold, the node 100*a* provides more communication opportunities for the nodes using CSMA/CA, whereas if the remaining battery life is equal to or lower than the threshold, the node 100*a* provides more communication opportunities for the nodes using TSCH.

In addition to the remaining battery life, the node 100*a* may switch the schedules in accordance with the physical location (physical installation location or latitude/longitude) of the node 100*a*, the logical location (location in a network topology) of the node 100*a*, and inputs from sensors (e.g., illuminometers, motion detectors).

As described above, according to the first and second embodiments and the modifications thereof, a communication system that allows nodes to communicate using a plurality of control schemes that differ from each other can be built effectively.

Figure 17:
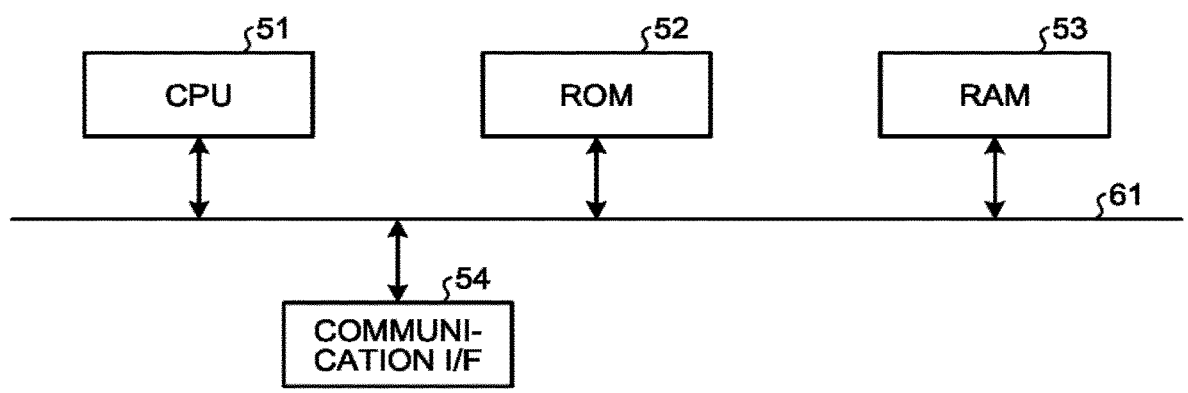
FIG. 17 is a diagram illustrating a hardware configuration of a node according to the first or second embodiment.

Described next is a hardware configuration of the communication device (node) according to the first or second embodiment with reference to FIG. 17. FIG. 17 is a diagram illustrating an example hardware configuration of the communication device according to the first or second embodiment.

The communication device according to the first or second embodiment above includes a control device such as a CPU 51, storage devices such as a read only memory (ROM) 52 and a RAM 53, a communication interface (I/F) 54 that connects the communication device to a network for communication, and a bus 61 that connects these devices.

A computer program executed by the communication device according to the first or second embodiment is embedded and provided in the ROM 52, for example.

The computer program executed by the communication device according to the first or second embodiment above may be recorded in a computer-readable recording medium such as a compact disc read only memory (CD-ROM), a flexible disk (FD), a compact disc recordable (CD-R), and a digital versatile disc (DVD), as an installable or executable file and provided as a computer program product.

The computer program executed by the communication device according to the first or second embodiment above may be stored in a computer connected to a network such as the Internet and provided by being downloaded via the network. Furthermore, the computer program executed by the communication device according to the first or second embodiment above may be provided or distributed via a network such as the Internet.

The computer program executed by the communication device according to the first or second embodiment above can cause a computer to function as the units of the communication device described above. The computer can execute the computer program such that the CPU 51 reads the computer program from a computer-readable storage medium on a main memory and executes it.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a plurality of communication controllers configured to control communication in accordance with a plurality of control schemes that differ from each other; and
   a selector configured to select a communication controller for use in communication from the communication controllers based on selection criteria, wherein
   the communication controllers include a first communication controller that controls communication using a time-division multiplexing scheme;
   the selection criteria represent a communication schedule for the time-division multiplexing scheme, the communication schedule specifying a time from which the first communication controller is used and specifying a time from which a communication controller other than the first communication controller is used,
   the selector selects the first communication controller or the communication controller other than the first controller based on the specified time, and
   the selection criteria include a plurality of communication schedules that are switched in accordance with time.

2. The communication device according to claim 1, wherein the selection criteria include at least one of time, a network connection status, and an operating status of the communication device.

3. The communication device according to claim 1, further comprising
   an alteration processor configured to alter the selection criteria in accordance with a control scheme used by another communication device communicating with the communication device.

4. The communication device according to claim 1, wherein the selection criteria include a criterion having priority information.

5. A communication method implemented by a communication device including a plurality of communication controllers that control communication in accordance with a plurality of control schemes that differ from each other, the communication method comprising:
   selecting a communication controller for use in communication from the communication controllers based on selection criteria, wherein
   the communication controllers include a first communication controller that controls communication using a time-division multiplexing scheme;
   the selection criteria represent a communication schedule for the time-division multiplexing scheme, the communication schedule specifying a time from which the first communication controller is used and specifying a time from which a communication controller other than the first communication controller is used,
   the selecting includes selecting the first communication controller or the communication controller other than the first controller based on the specified time, and
   the selection criteria include a plurality of communication schedules that are switched in accordance with time.

6. A computer program product having a non-transitory computer readable medium including programmed instructions, wherein the instructions, when executed by a computer including a plurality of communication controllers that control communication in accordance with a plurality of control schemes that differ from each other, cause the computer to perform:
- selecting a communication controller for use in communication from the communication controllers based on selection criteria, wherein
- the communication controllers include a first communication controller that controls communication using a time-division multiplexing scheme;
- the selection criteria represent a communication schedule for the time-division multiplexing scheme, the communication schedule specifying a time from which the first communication controller is used and specifying a time from which a communication controller other than the first communication controller is used,
- the selecting includes selecting the first communication controller or the communication controller other than the first controller based on the specified time, and
- the selection criteria include a plurality of communication schedules that are switched in accordance with time.

* * * * *